(12) United States Patent
McBagonluri et al.

(10) Patent No.: US 8,077,894 B2
(45) Date of Patent: Dec. 13, 2011

(54) FEATURE PROTECTION FOR STEREO LITHOGRAPHIC MANUFACTURING PROCESSES

(75) Inventors: Fred McBagonluri, Windsor, NJ (US); Oleg Saltykov, Fairlawn, NJ (US); Salman Parsi, Somerset, NJ (US)

(73) Assignee: Siemens Hearing Instruments, Inc., Piscataway, NJ (US)

( * ) Notice: Subject to any disclaimer, the term of this patent is extended or adjusted under 35 U.S.C. 154(b) by 1361 days.

(21) Appl. No.: 11/625,371

(22) Filed: Jan. 22, 2007

(65) Prior Publication Data

US 2008/0175424 A1    Jul. 24, 2008

(51) Int. Cl.
*H04R 25/00* (2006.01)
(52) U.S. Cl. .................. 381/322; 381/324; 381/328
(58) Field of Classification Search .............. 381/322, 381/324, 328, 380; 181/129, 130, 135; 264/401, 264/328.1, 250; 428/2.1; 29/896.21
See application file for complete search history.

(56) References Cited

U.S. PATENT DOCUMENTS

| 6,766,878 | B2 * | 7/2004 | Widmer et al. ............... 181/135 |
| 2002/0196954 | A1 | 12/2002 | Marxen |
| 2005/0074543 | A1 * | 4/2005 | Stevens et al. ............... 427/2.1 |
| 2009/0189313 | A1 * | 7/2009 | Masters ................... 264/328.1 |

FOREIGN PATENT DOCUMENTS

EP    1 120 228 A2    8/2001

OTHER PUBLICATIONS

Extended European Search Report for European Patent Application No. 08250260.0 dated Jul. 22, 2010.

* cited by examiner

*Primary Examiner* — Huyen D Le
(74) *Attorney, Agent, or Firm* — Francis G. Montgomery

(57) ABSTRACT

To prevent stereo lithography (SLA) support structures for parts fabricated in an SLA apparatus from interfering with features in the parts, a structural shield such as a dome may be place around the feature and then discarded at the conclusion of the SLA process.

4 Claims, 7 Drawing Sheets

FEATURE PROTECTION FOR STEREO LITHOGRAPHIC MANUFACTURING PROCESSES

BACKGROUND AND SUMMARY OF THE INVENTION

A hearing instrument for insertion into the user's ear canal may be manufactured by fabricating the hearing instrument shell using stereo lithography (SLA), one of the processes mentioned in U.S. Patent Application Publication No. 2002/0196954 A1, published Dec. 26, 2002 and titled, "Modeling and fabrication of three-dimensional irregular surfaces for hearing instruments," incorporated here by reference. When using SLA, a part is constructed layer by layer. Since the raw material is a liquid bath, a means of supporting the initial layers is required to prevent the piece from floating away.

Typically, a support structure is created along with the part and then later discarded (e.g., during a finishing process such as tumbling). One such support structure comprises a plurality of thin columns, perhaps braced together. When the part is finished, it is lifted out of the structure and the bath, and the support structure is discarded.

Some hearing instrument shells have receiver holes with finely detailed features. Since the receiver hole is located on the tip of the shell, it is one of the first items formed during the SLA process. Further, as the support structures are created simultaneously with the shell, these structures may extend into openings on the bottom of the shell, such as the receiver hole. Once the part is finished, extensive machining may be required to remove the support from the receiver hole and restore the hole structure.

The entry of the support structure into the receiver hole can be prevented by shielding the receiver hole with a structure such as a dome having a thin shell. Once the part is completed, the dome can be removed without harming the part.

DESCRIPTION OF THE INVENTION

Figure 1:
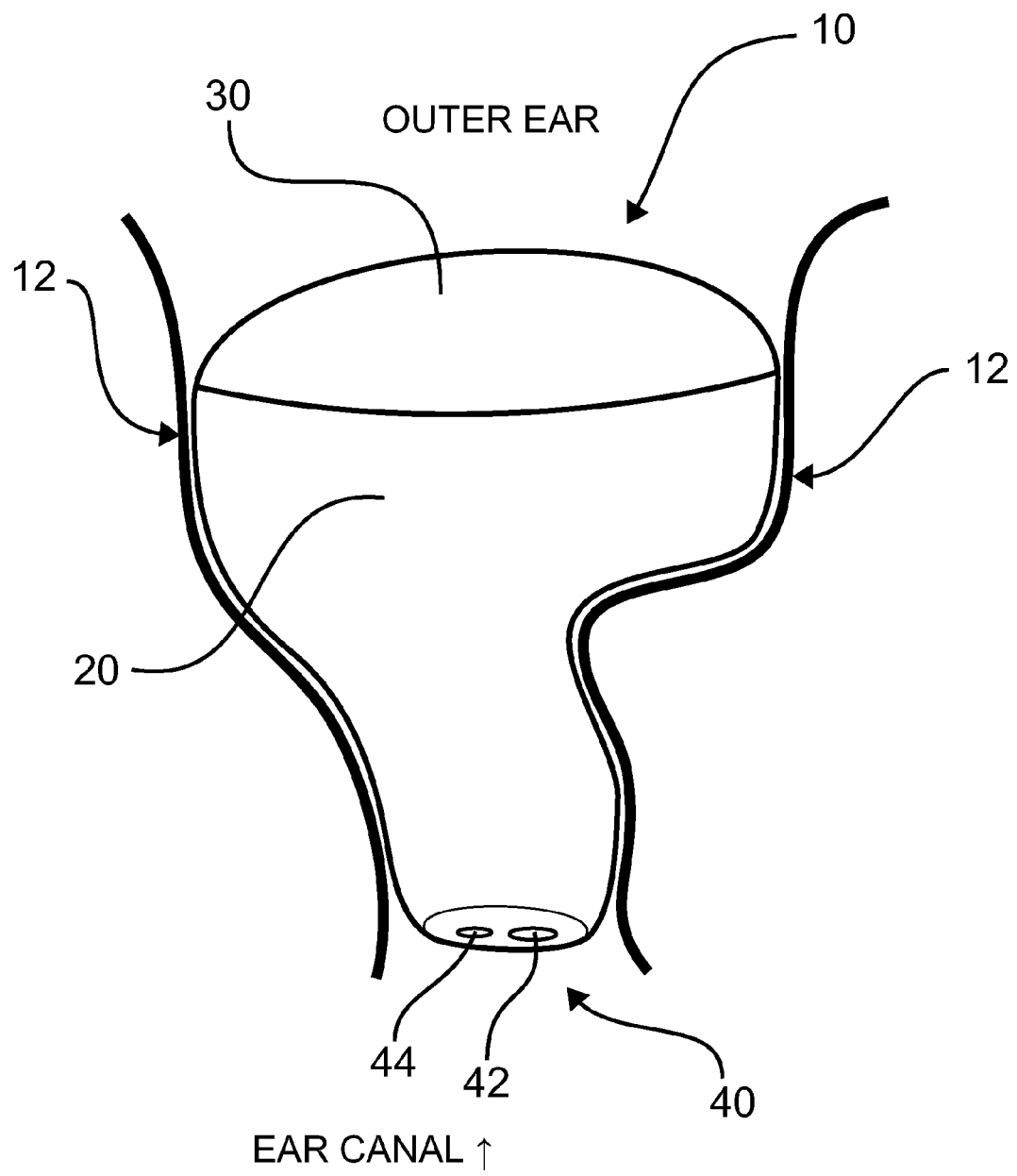
FIG. 1 is an elevation view of a hearing instrument in an ear canal and comprising a tip having a receiver hole and a vent hole.
Figure 2:
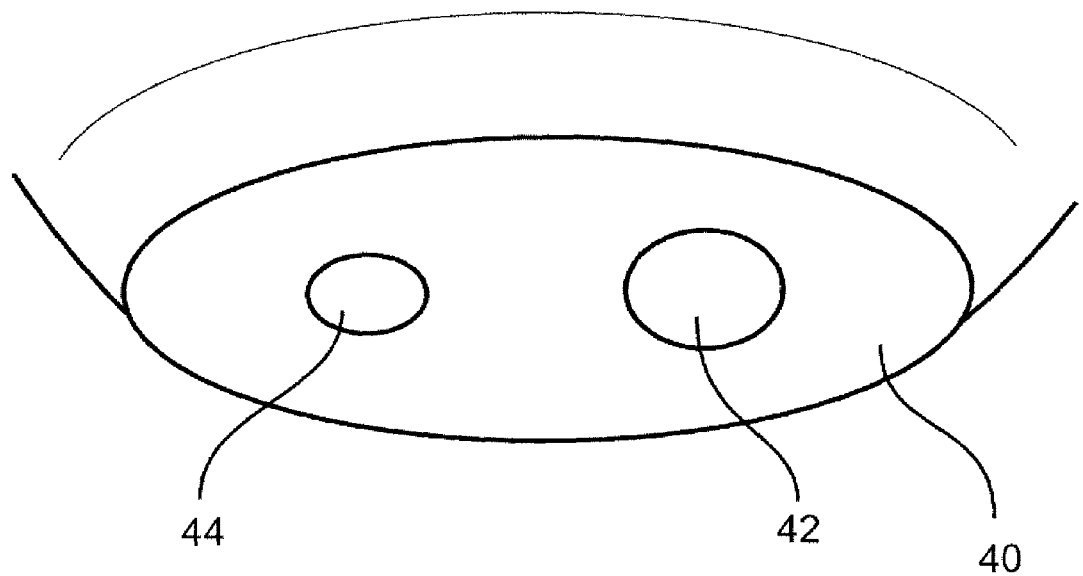
FIGS. 2 and 3 are perspective views of the tip of the hearing instrument shell, illustrating the receiver hole and the vent hole.
Figure 3:
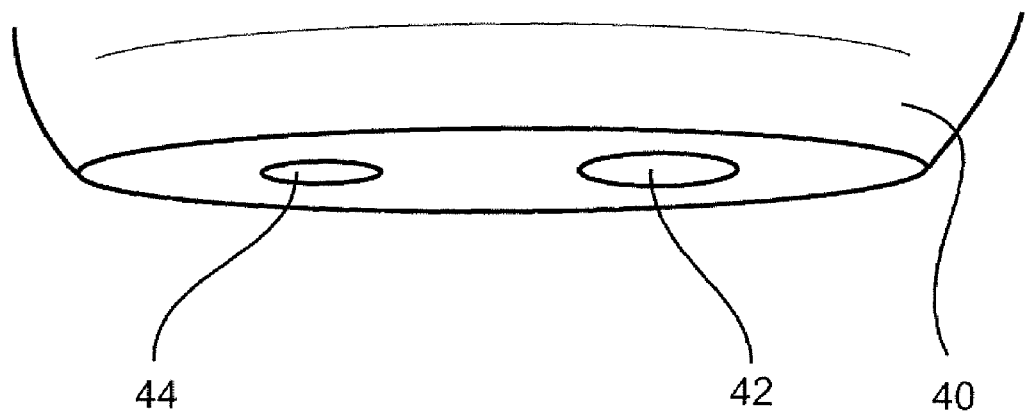

A hearing instrument 10 comprising a shell 20 and a faceplate 30 is shown in the user's ear canal 12 in FIG. 1. The shell 20 has a shell tip 40 comprising apertures such as a receiver hole 42 and an optional vent hole 44. The receiver hole 42 and the optional vent hole 44 are shown again in perspective views of the hearing instrument shell tip 40 in FIGS. 2 and 3. Although the shell tip 40 is shown with a flat surface in FIGS. 2 and 3. (and In the subsequent figures), it may be rounded or assume some other shape.

Figure 4:
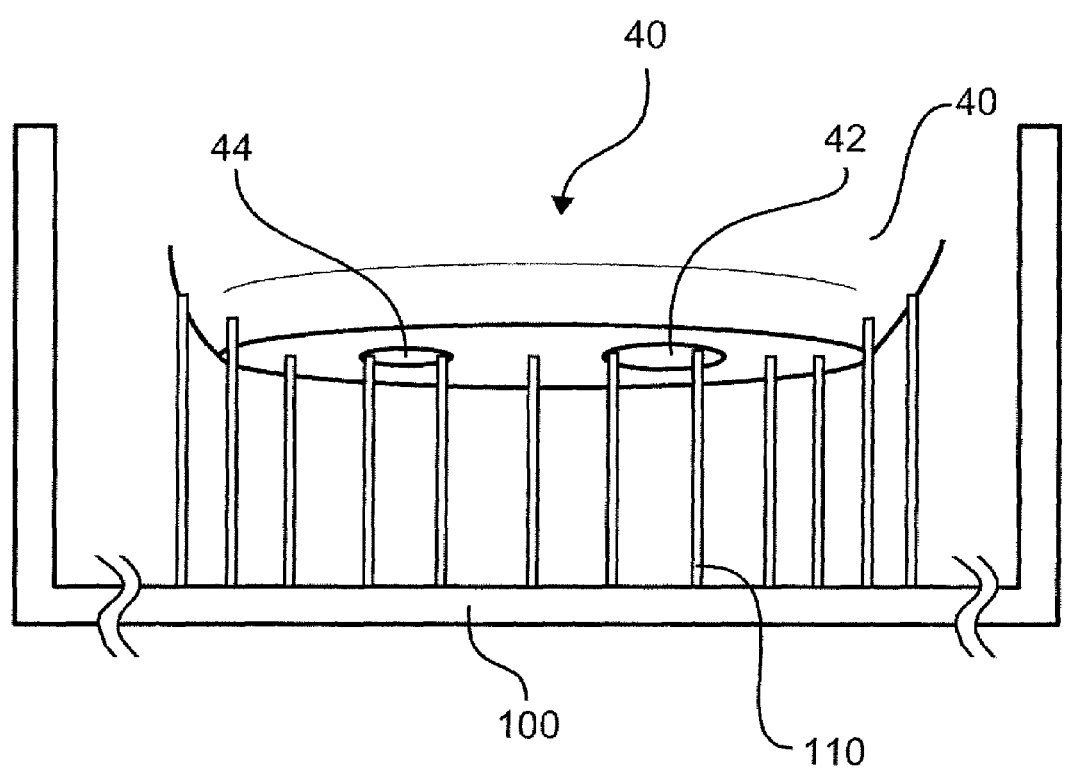
FIG. 4 is a drawing of the tip of the hearing instrument shell as it is fabricated and the accompanying support structures.

An apparatus 100 for fabricating the hearing instrument shell 20 using stereo lithography (SLA) is shown in schematic representation in FIG. 4 with a portion of the shell tip 40. The figure also shows support structure elements 110. Although these support structure elements 110 are illustrated as thin, rectangular columns in the figure, they may assume the shape determined by the particular SLA process employed.

Since the support structure elements 110 are designed to extend to a solid surface, they will enter openings in the underside of the device being fabricated. For example, in FIG. 4, they extend into the receiver hole 42 and the vent hole 44. After the part has been completed, the portions of the support structure elements 110 remaining in the receiver hole 42 and the vent hole 44 must be removed. Further, if the receiver hole 42 has a shape other than a simple round hole, the hole must be restored to the desired configuration. For example, the receiver hole may have a keyway slot that has been obscured or otherwise altered by a support structure element 110. A machining operation may be required to restore that feature.

Figure 5:
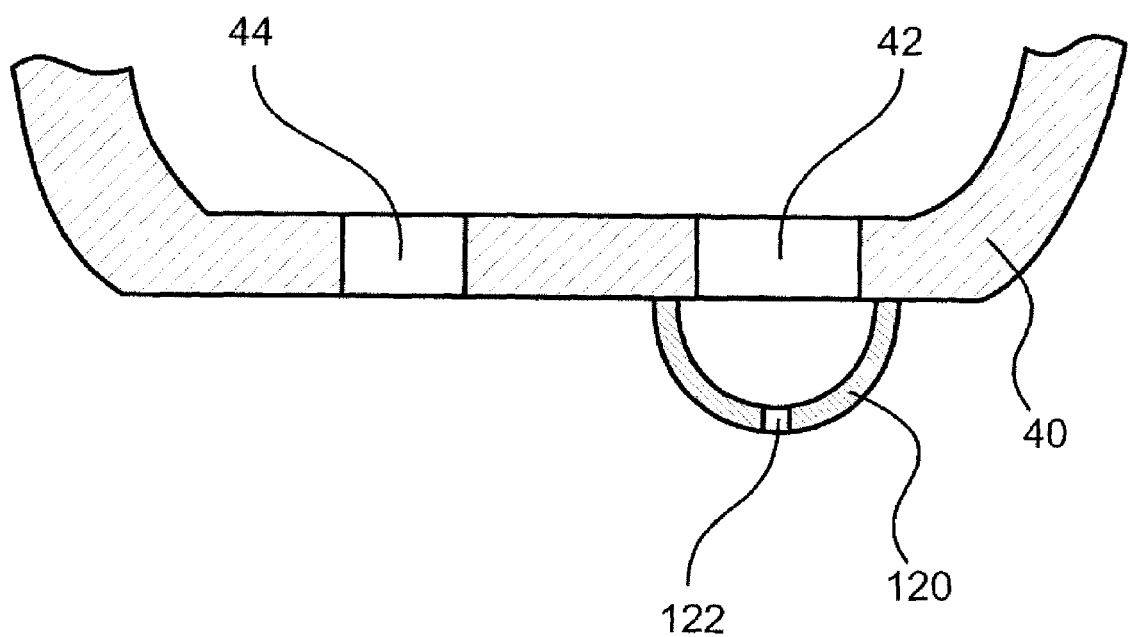
FIG. 5 is a partial cross-sectional view of the tip of the hearing instrument shell, illustrating a protective dome covering the receiver hole.
Figure 6:
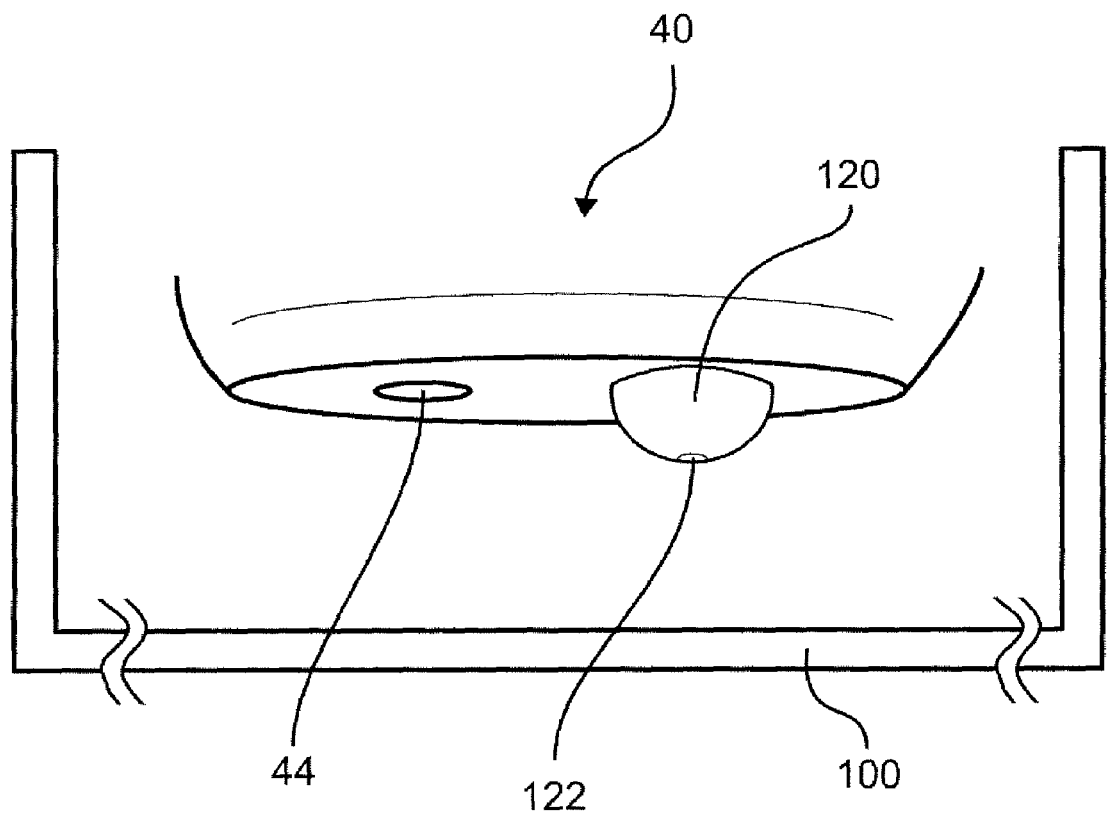
FIG. 6 is a drawing of the shell tip, having a protective dome covering the receiver hole, as it is fabricated, with the accompanying support structures not shown.

To prevent the intrusion of a support structure element 110 into the receiver hole 42 (or the vent hole 44), a protective structural shield may be built around or in front of the hole 42, 44. One such structure is a dome 120 with a thin shell, as shown in the cross-sectional view of the hearing instrument shell tip 40 in FIG. 5 and again in FIG. 6. The dome 120 has a drain hole 122 that permits excess material, in liquid form, to drain from the dome 120 when the completed part is removed from the SLA apparatus 100. Although the figures show a dome-shaped structure covering the receiver hole 42, other shapes could be used as well.

The thickness of the dome 120 is selected to facilitate its removal from the hearing instrument shell 20 during the finishing phase. For example, where the hearing instrument shell 20 has a thickness of 0.6-1.0 mm, the dome 120 may have a thickness of 0.1-0.2 mm.

Figure 7:
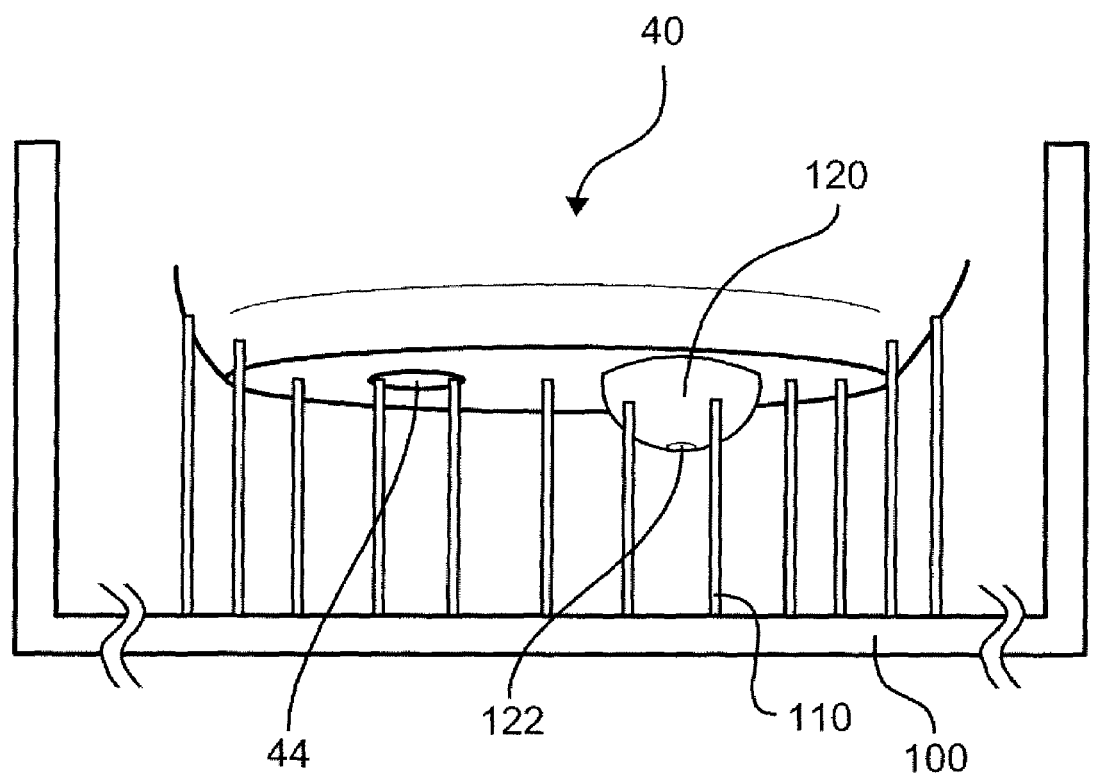
FIGS. 7 and 8 are drawings of the shell tip, having a protective dome, as it is fabricated and the accompanying support structures.
Figure 8:
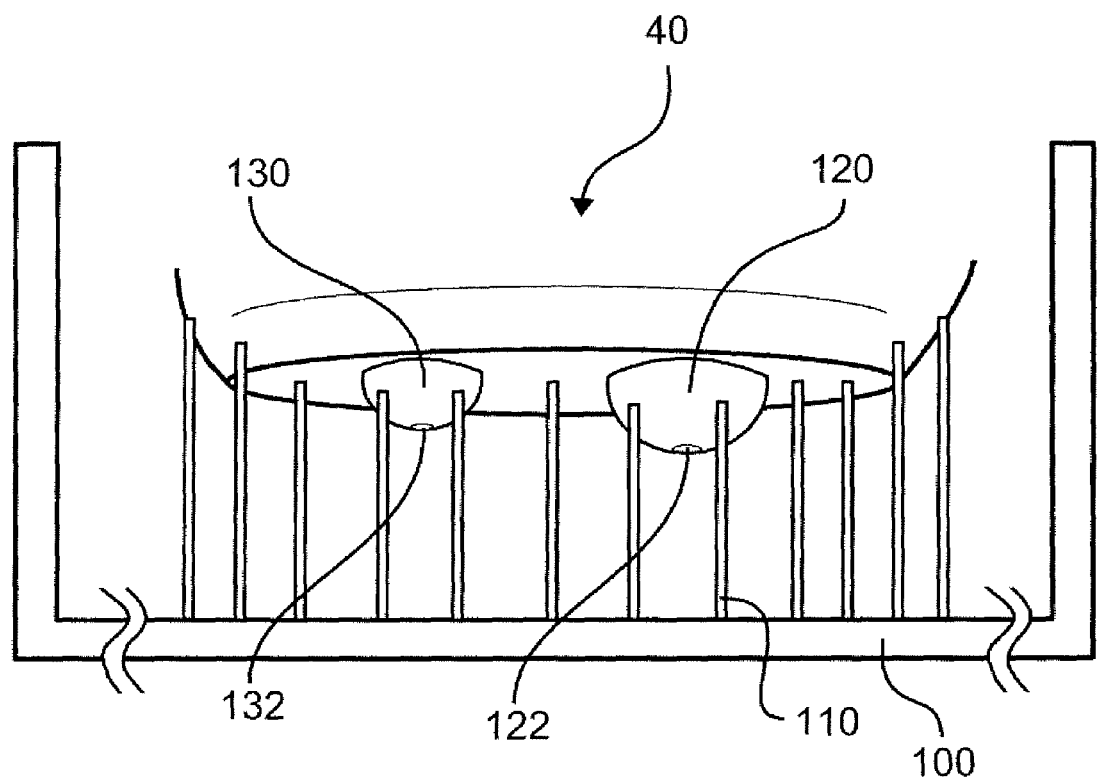

In FIG. 7, the SLA apparatus 100 is again shown with a hearing instrument shell tip 40 having a dome 120 covering the receiver hole 42. As illustrated, the dome 120 prevents the support structure elements 110 from entering the receiver hole 42. In FIG. 8, an additional dome 130 covers the optional vent hole 44, similarly preventing the support structure elements 110 from entering the hole 44.

After the hearing instrument shell 20 is completed, it will undergo a finishing process such as tumbling. During that process, the domes 120, 130 and any support structure elements 110 that remain are removed.

What is claimed is:

1. A method for fabricating a hearing instrument shell comprising at least one aperture, using stereo lithography, comprising:

generating a model of the shell for a stereo lithography fabrication apparatus;

determining the location of at least one aperture in the model of the shell;

selectively adding a structural shield covering the aperture;

providing the model to the stereo lithography fabrication apparatus;

fabricating the shell with the stereo lithography fabrication apparatus; and removing the structural shield.

2. A method as set forth in claim 1, where selectively adding a structural shield covering the aperture comprises adding a dome.

3. A method as set forth in claim 1, where selectively adding a structural shield covering the aperture comprises covering a receiver hole.

4. A method as set forth in claim 1, where selectively adding a structural shield covering the aperture comprises covering a vent hole.

* * * * *